United States Patent
Horie et al.

(10) Patent No.: US 6,974,368 B2
(45) Date of Patent: Dec. 13, 2005

(54) METHOD OF PRODUCING MAGNETIC HARD DISK SUBSTRATE

(75) Inventors: Yuji Horie, Tokyo (JP); Hiromitsu Okuyama, Tokyo (JP); Tatsuya Tanifuji, Tokyo (JP)

(73) Assignee: NIHON Microcoating Co., Ltd., Tokyo (JP)

( * ) Notice: Subject to any disclaimer, the term of this patent is extended or adjusted under 35 U.S.C. 154(b) by 32 days.

(21) Appl. No.: 10/776,372

(22) Filed: Feb. 10, 2004

(65) Prior Publication Data

US 2004/0241379 A1 Dec. 2, 2004

(30) Foreign Application Priority Data

Feb. 24, 2003 (JP) ...................................... 2003-092680

(51) Int. Cl.[7] ................................................ B24B 1/10
(52) U.S. Cl. ...................... 451/36; 451/41; 428/694 SG
(58) Field of Search .............................. 451/36, 41, 28, 451/54; 428/694 SG, 694 ST, 426, 432, 433

(56) References Cited

U.S. PATENT DOCUMENTS 6,743,529 B2 * 6/2004 Saito et al. ........... 428/694 SG
2002/0127432 A1 * 9/2002 Saito et al. ........... 428/694 SG
2002/0142707 A1 * 10/2002 Shimada et al. ............... 451/44
2004/0238002 A1 * 12/2004 Tanaka et al. .................. 134/6
2005/0008822 A1 * 1/2005 Miyamoto et al. .......... 428/141

* cited by examiner

Primary Examiner—Jacob K. Ackun, Jr.
(74) Attorney, Agent, or Firm—Beyer Weaver & Thomas LLP

(57) ABSTRACT

A magnetic hard disk substrate is produced by rotating an aluminum substrate or a glass substrate, supplying polishing slurry on its surface, pressing a polishing tape on the surface and running it in a direction opposite to the direction of rotation of the substrate. Texturing marks are formed with a line density greater than 70 lines/$\mu$m in the radial direction on the surface. The polishing slurry has abrading particles dispersed in a dispersant. The abrading particles may be monocrystalline diamond particles, polycrystalline diamond particles or cluster particles with such monocrystalline and polycrystalline diamond particles with diameters in the range of 1–50 nm. Agglomerated particles of such cluster particles that are agglomerated in the dispersant may also be included as the abrading particles.

13 Claims, 6 Drawing Sheets

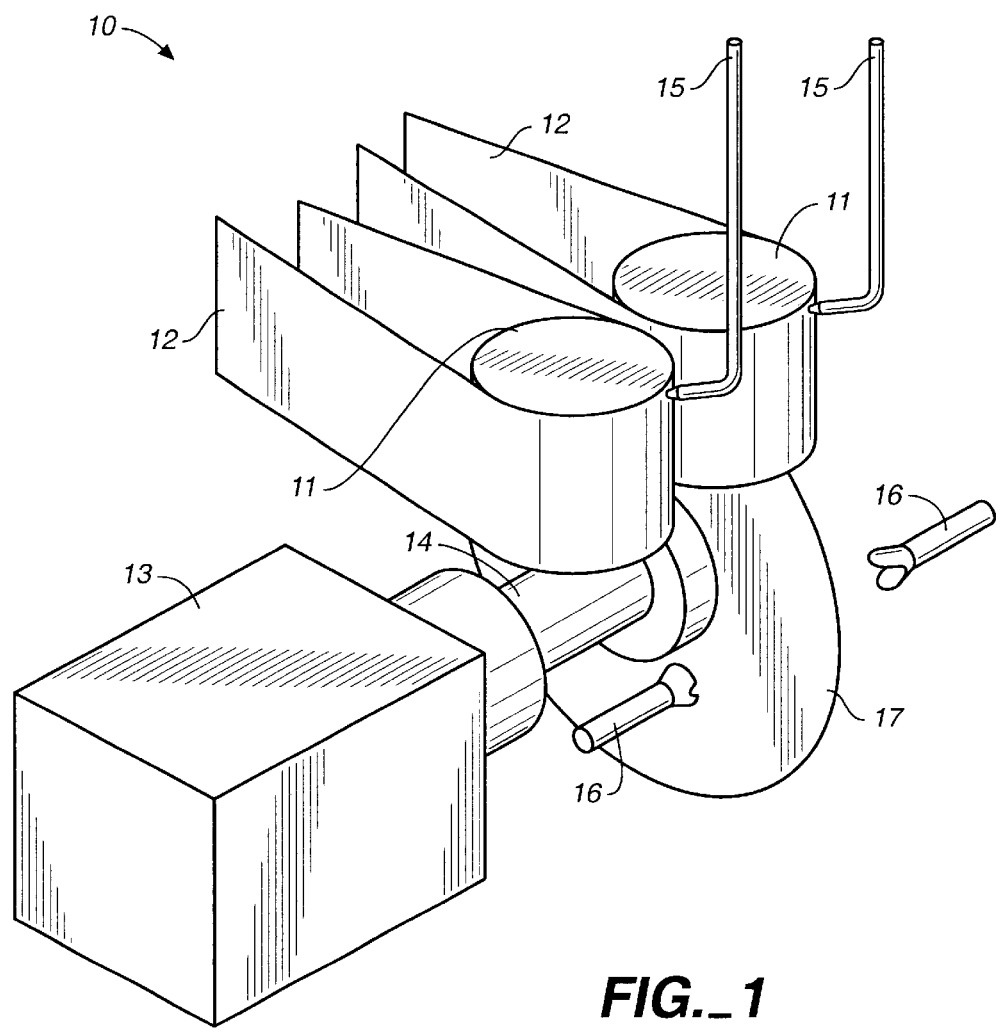
FIG._1
*(PRIOR ART)*

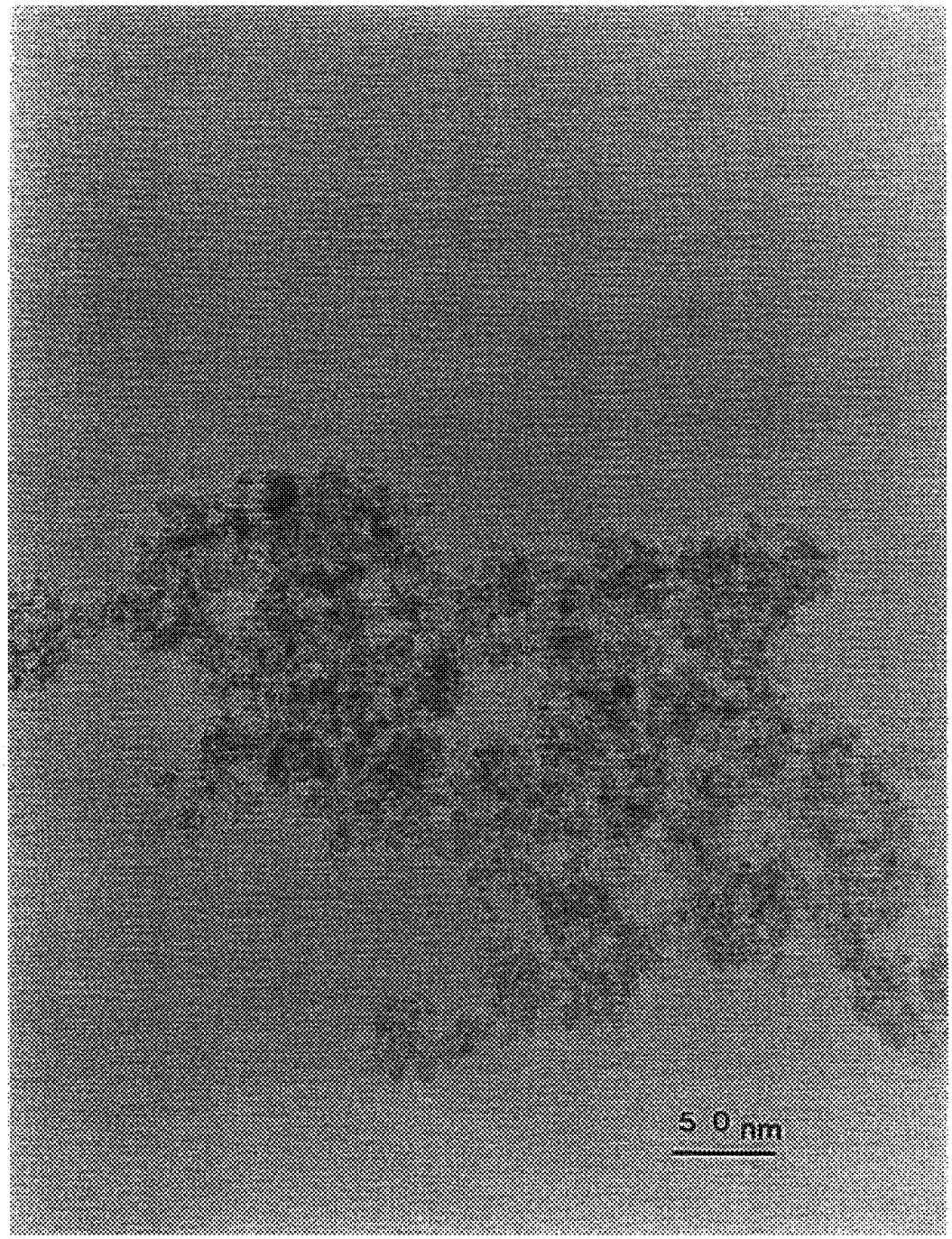
FIG._2

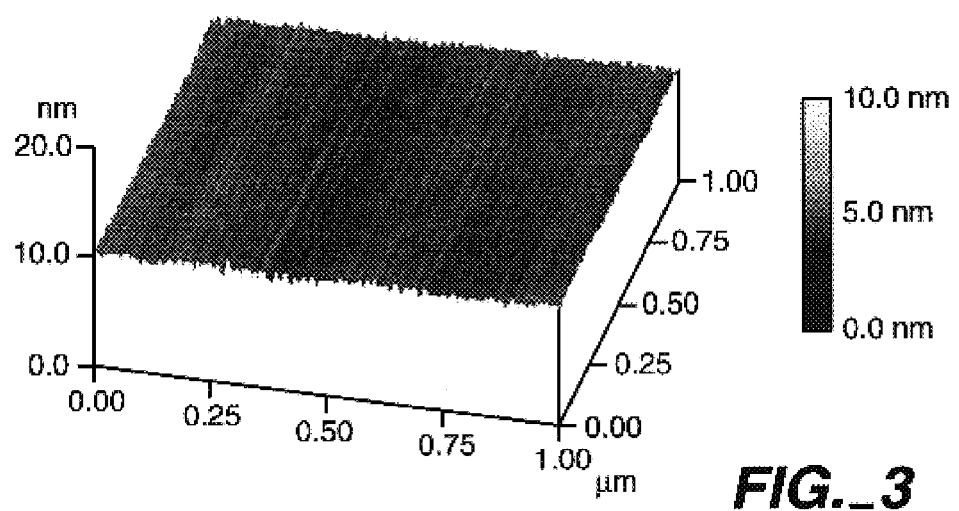
FIG._3
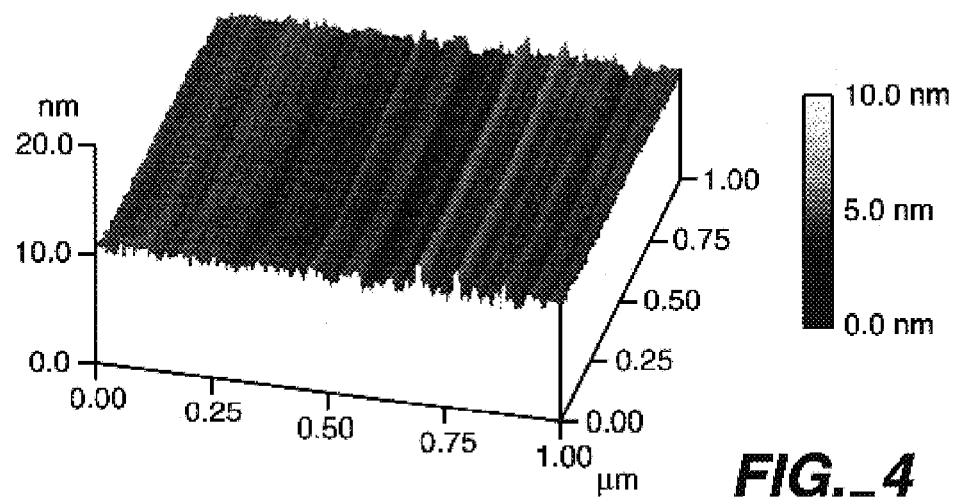
FIG._4
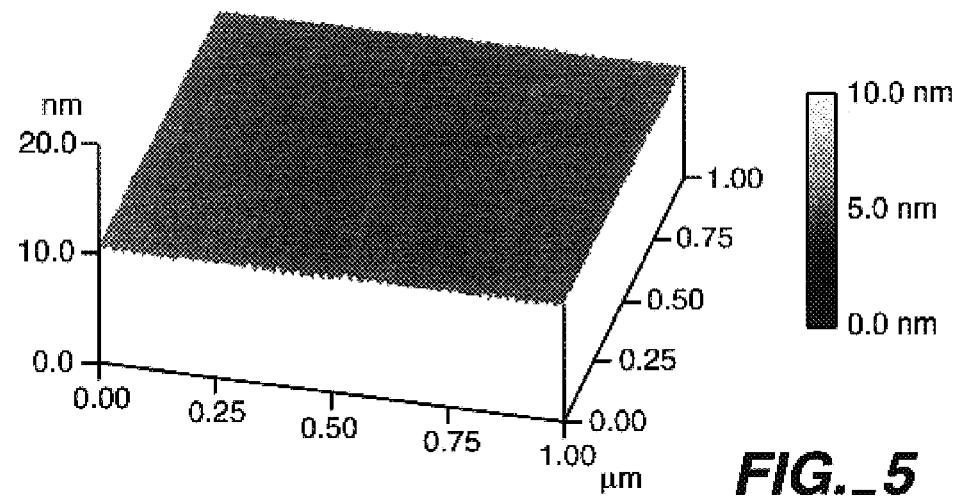
FIG._5

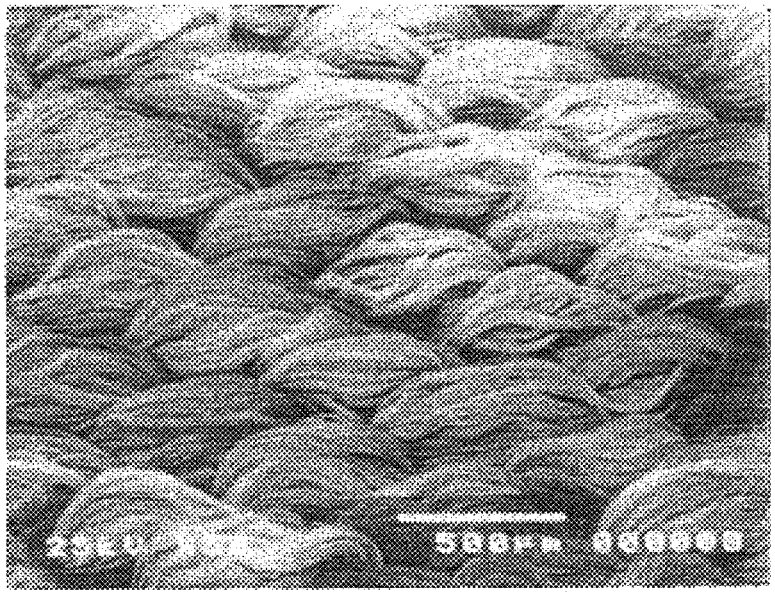
FIG._6A
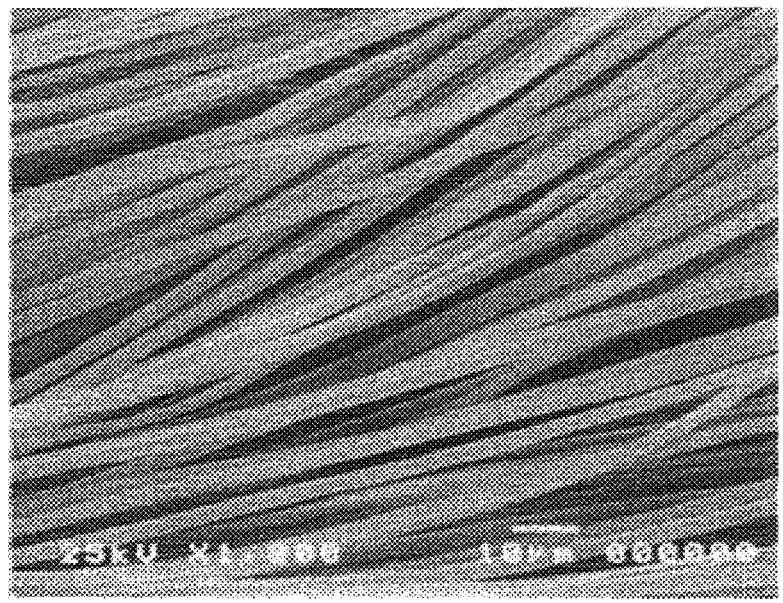
FIG._6B

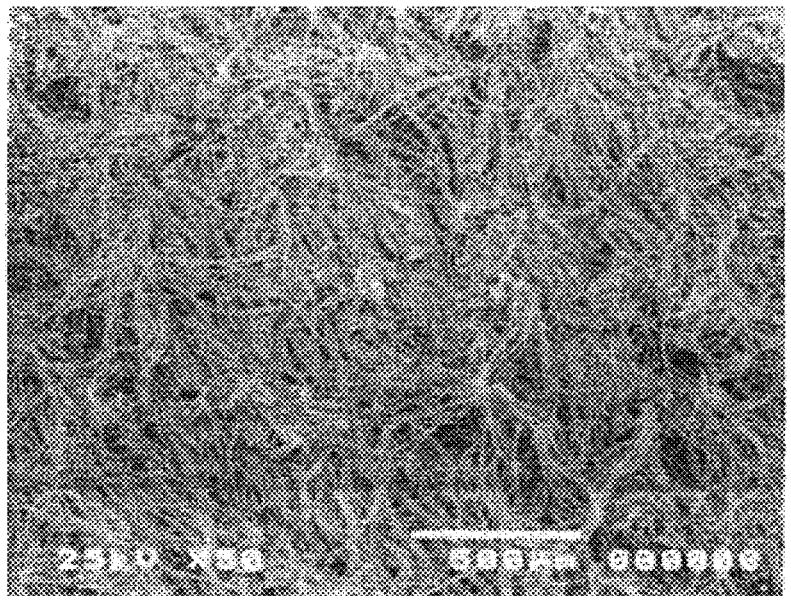
FIG._7A
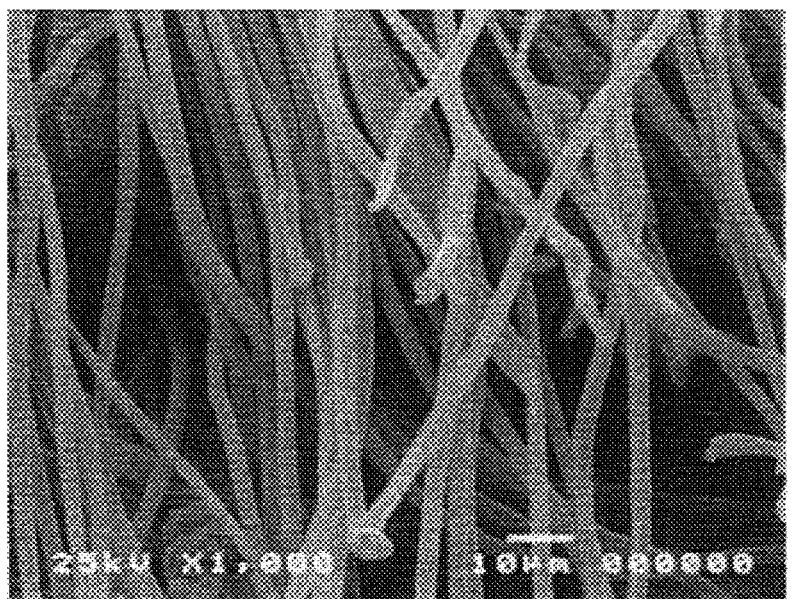
FIG._7B

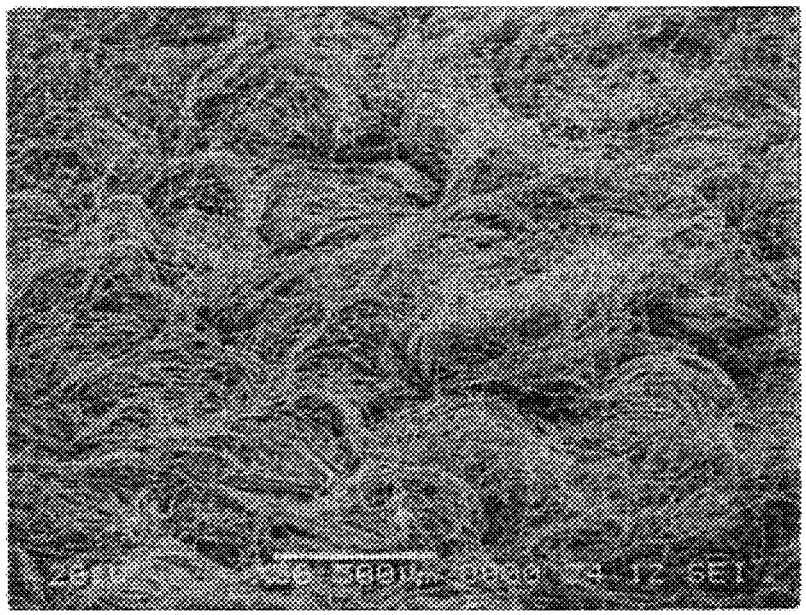
FIG._8A
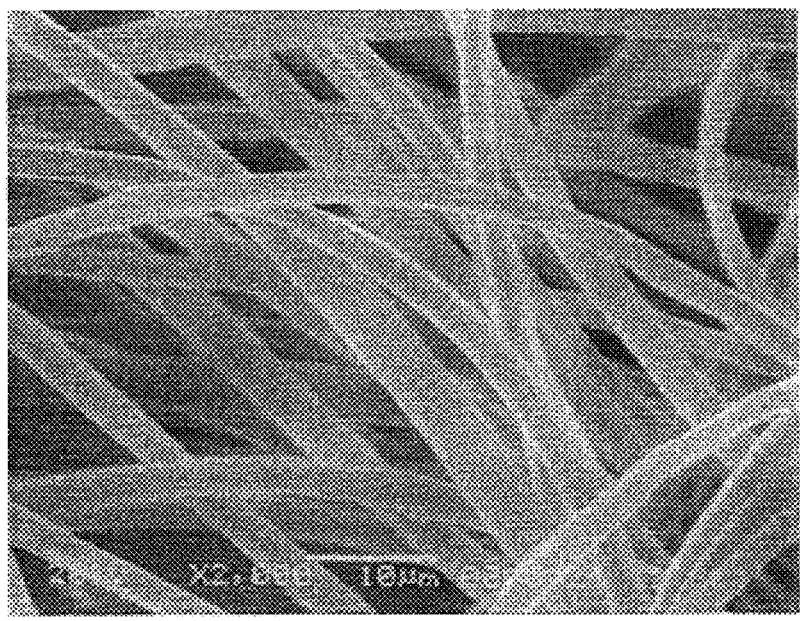
FIG._8B

METHOD OF PRODUCING MAGNETIC HARD DISK SUBSTRATE

This application claims priority on Japanese patent application 2003-92680 filed Feb. 24, 2003.

BACKGROUND OF THE INVENTION

This invention relates to a method of producing a magnetic hard disk substrate having texturing marks formed on the surface of an aluminum or glass substrate.

A magnetic hard disk serving as a magnetic recording medium for recording data is mounted, for example, to an external memory device such as a magnetic memory of a computer. Such a magnetic hard disk has a magnetic medium formed on the surface of a substrate (herein referred to as the magnetic hard disk substrate) and data are recorded on this magnetic medium. Aluminum substrates with the surface treated with alumite or non-magnetically plated, for example, by Ni—P plating or glass plates are widely being used as a magnetic hard disk substrate.

The magnetic hard disk substrate is mirror-polished first and then subjected to a texturing process for having texturing marks formed on its surface. A magnetic layer (magnetic medium) and a protective layer are thereafter sequentially formed on the surface by a known film-making technology such as a sputtering process to produce the magnetic hard disk.

Circular indentations and protrusions (referred to as the tracks) are formed on the surface of the magnetic hard disk substrate, shaped similarly as and concentric with the texturing marks. Since these indentations and protrusions are obtained by forming the magnetic and protective layers on the indentations and protrusions originally formed on the surface of the magnetic hard disk substrate, they are higher and less sharply sloped than the indentations and protrusions on the magnetic hard disk substrate. For this reason, fine texturing marks without abnormal protrusions must be formed precisely on the surface of the magnetic hard disk substrate.

In recent years, magnetic hard disks are being made compact and their capacities are being increased. Accordingly, magnetic hard disks with higher recording densities are being required. In order to increase the recording density of a magnetic hard disk, the track pitch in the radial direction of the magnetic hard disk must be made finer and the bit density (density of recording wavelength) in the circumferential direction must be increased. In order to make the track pitch finer, however, the line density of the texturing marks on the surface of the magnetic hard disk substrate must be increased, say, to 70 lines/$\mu$m or more.

If a magnetic hard disk substrate is produced with texturing marks at such a high line density, the width of these texturing marks must necessarily be very small, and a known film-making technology such as a sputtering process must be used to cover the entire surface of such a magnetic hard disk substrate with magnetic particles. This means that it is not enough to simply make the pitch of the texturing marks very small and that it is also necessary to make the depths of the texturing marks uniform over the entire surface of the magnetic hard disk substrate. For example, texturing marks must be formed so as to make the ratio d/p of its depth d and its pitch p to be within the range of 0.01–0.3 and its average value within the range of 0.02–0.2.

In order to record and reproduce signals efficiently, furthermore, it is necessary to reduce the floating distance of the magnetic head from the surface of the magnetic hard disk, say, to less than 50 nm. In order to thus reduce the floating distance of the magnetic head, it is necessary to prevent the adsorption and collision of the magnetic head to and with the surface of the magnetic hard disk.

In order to prevent the adsorption of the magnetic head, the surface of the magnetic hard disk must be made sufficiently rough, and this is why approximately concentric circular protrusions and indentations called texturing marks are formed on the surface of the magnetic hard disk substrate by a texturing process such that not only is an appropriate degree of roughness provided to the surface of the magnetic hard disk but also a magnetic directionality is provided in the circumferential direction on the surface of the magnetic hard disk so as to improve its magnetic characteristics. In order to improve the magnetic characteristics, texturing marks must be made very fine, and this means that their pitch must be made very small and that the marks must be made at a very high line density.

In order to prevent the collision of the magnetic head and to stably keep the magnetic head at a small floating distance, it is necessary to make the textured surface of the magnetic hard disk substrate free of abnormally high protrusions, or that the average surface roughness Ra be within the range of 1–3 Å and that the maximum height of the protrusion be less than 30 Å.

Thus, the texturing process has become one of crucially important production processes for magnetic hard disks (as a magnetic recording medium) to be installed to an external memory device such as a magnetic recording device of a computer, determining the line density as well as reliability of the magnetic hard disk.

The texturing process is carried out by supplying slurry on the surface of a rotating magnetic hard disk substrate and pressing a polishing tape thereon such that approximately concentric circular texturing marks are mechanically formed on the surface of the magnetic hard disk substrate by free abrading particles. Polishing slurry having particles of one or more kinds of material such as diamond, alumina and silica dispersed in a dispersant is used. The polishing tape may be a tape of woven, unwoven, or flocked cloth or a foamed material.

In order to accurately form fine texturing marks with no abnormal protrusions on the surface of a magnetic hard disk, many studies have been made regarding the material, size and shape of the particles to be contained in the polishing slurry. As a result, diamond particles have come to be widely used since diamond has superior characteristics regarding resistance against abrasion, heat, oxidation and chemicals.

Diamond particles may be monocrystalline particles or polycrystalline particles. Monocrystalline diamond particles are polygonal particles with corners around them while polycrystalline diamond particles are spherical particles with no corners around them. Fine texturing marks can be formed on the surface of a magnetic hard disk substrate by a texturing process using these monocrystalline and polycrystalline diamond particles. Since scratches and abnormal protrusions are formed on the surface of a magnetic hard disk substrate by using monocrystalline diamond particles, polycrystalline diamond particles are usually used if diamond particles are to be used.

Conventional texturing processes by using polycrystalline diamond particles as polishing particles were carried out in two stages. As disclosed in Japanese Patent Publication Tokkai 6-150304, the first stage is carried out by using a polishing tape having relatively more abrasive polishing particles affixed thereto and the second stage is carried out by using polishing slurry having polishing particles comprising polycrystalline diamond particles with average diameter less than 1 μm dispersed therein and removing the abnormal protrusions formed on the surface of the magnetic hard disk substrate in the first stage of the texturing process by means of free polishing particles. Since polycrystalline diamond particles are nearly spherical and have not sharp corners, as explained above, their polishing power is weak, and they can be effectively used for removing such abnormal protrusions formed during the texturing process of the first stage. Texturing marks without abnormal protrusions are formed as a synergistic result of the texturing processes of the first and second stages.

This conventional technology is disadvantageous because it requires processes in two stages and hence it is both time-consuming and costly. Moreover, since the texturing process of the second stage is merely for the purpose of removing the abnormal protrusions and the line density of the texturing marks depends only on the texturing process of the first stage. Thus, it is not possible to provide fine texturing marks such as those with line density of 70 lines/μm, as being required in recent years.

Japanese Patent Publication Tokkai 11-138424 discloses another technology characterized as using polishing slurry having polycrystalline diamond particles dispersed in a dispersant in the form of primary particles. This is because the presence of flocks (coagulated, or agglomerated particles) as secondary particles in the polishing slurry was believed to cause unevenness in the size of the abrading particles such that scratches and abnormal protrusions are formed on the surface of the magnetic hard disk substrate and hence that uniform texturing marks cannot be formed. With polishing slurry using polycrystalline diamond particles in the form of primary particles for the polishing, however, texturing marks cannot be formed with a line density as high as 70 lines/μm, as is required in recent years.

It is generally known that abrading particles with smaller diameters must be used in order to form finer texturing marks and also that abrading particles with a uniform size must be used in order to form uniform texturing marks. If only the size of the abrading particles is made smaller in this prior art technology with a polishing tape made of a woven or unwoven cloth or a flocked material (planted with piles), the abrading particles easily pass through the gaps between the fibers of which the polishing tape is comprised. If a polishing tape made of a foamed material is used, on the other hand, the abrading particles can easily enter the indentations formed by air bubbles on the surface of the polishing tape. As a result, the abrading particles cannot polish the surface of the magnetic hard disk substrate uniformly and the polishing power becomes reduced either locally or all over the surface of the magnetic hard disk substrate. In other words, a surface that is uneven in roughness will result, and precisely defined uniform texturing marks cannot be formed.

Japanese Patent Publication 2002-30275 discloses still another technology related to the use of abrading particles comprising polycrystalline diamond particles and is characterized as using polishing slurry having dispersed in a dispersant agglomerated polycrystalline particles obtained by affirmatively causing the primary particles comprising polycrystalline diamond particles with diameters less than about 20 μm to be agglomerated. In other words, primary particles are agglomerated to increase the apparent unit particle diameter of the abrading particles (secondary particles), say, to 0.05–0.5 μm such that the problems of the kinds mentioned above can be obviated. Since it is the plurality of very small primary particles surrounding the abrading particles (secondary particles) that act on the surface of the magnetic hard disk substrate, furthermore, very fine texturing marks can be formed on the surface of the magnetic hard disk substrate. The secondary particles, which are relatively large, are easily broken off as the tape is pressed against the surface of the magnetic hard disk substrate and hence the scratches and abnormal protrusions on the surface of the magnetic hard disk substrate can be reduced.

In this technology, however, if polycrystalline diamond particles with diameters less than 10 nm (primary particles) are agglomerated to obtain secondary particles and if they are dispersed in a dispersant to obtain polishing slurry, the valley portions of the texturing marks become too shallow and fine texturing marks cannot be precisely formed.

SUMMARY OF THE INVENTION

It is therefore an object of this invention to provide a method of producing a magnetic hard disk substrate comprising an aluminum or glass substrate with a surface on which fine texturing marks are precisely formed with a line density of over 70 lines/μm in the radial direction and there are no abnormal protrusions.

A magnetic hard disk substrate according to this invention may be characterized as comprising a substrate which may be an aluminum substrate or a glass substrate having on its surface texturing marks with a line density greater than 70 lines/μm in the radial direction. The average surface roughness of the surface is less than 0.5 nm. The average of the ratio between the depth and pitch of the texturing marks is in the range of 0.02–0.2, and the ratio between the depth and pitch of the individual texturing marks is in the range of 0.01–0.3.

Such a magnetic hard disk substrate may be produced according to this invention by rotating an aluminum substrate or a glass substrate, supplying polishing slurry on its surface, pressing a polishing tape on the surface and running it in a direction opposite to the direction of rotation of the substrate. The polishing slurry that is used in the method comprises abrading particles and a dispersant therefor which may be water or a water-based aqueous solution. The abrading particles may be monocrystalline diamond particles, polycrystalline diamond particles or cluster particles comprising such monocrystalline and polycrystalline diamond particles with diameters in the range of 1–50 nm. The polishing slurry may further include agglomerated cluster particles comprising such cluster particles that are agglomerated in the dispersant. These abrading particles are contained by 0.01 weight % or more, preferably by 0.01–3 weight % and even more preferably by 0.01–1 weight % of the total weight of the polishing slurry.

The water-based aqueous solution to be used in the method of this invention is an aqueous solution having an additive added to water, the additive being one or more selected from non-ionic surfactants, organic phosphoric acid esters, higher fatty acid amides, glycol compounds, higher fatty acid metallic salts, amine salts of vegetable oils and fats and anionic surfactants. Such an additive is added so as to be 1–10 weight % of the total weight of the polishing slurry.

The polishing tape to be used according to this invention is of a material selected from woven cloth, unwoven cloth, flocked cloth, raised cloth and foamed materials. The woven cloth, unwoven cloth and raised cloth may comprise microfibers of one or two kinds such as polyester and nylon fibers with thickness in the range of 0.1–5 μm. Only the portions of the blocked or raised cloth that actually act on the surface of the glass substrate during the polishing process, that is, the planted fibers of the flocked cloth and the raised portion of the raised cloth may comprise microfibers as described above. The polishing tape of a foamed material has indentations with diameters in the range of 0.1–5 μm formed on the surface by air bubbles.

By the method of this invention, the cluster particles and agglomerated cluster particles in the polishing slurry supplied onto the surface of the aluminum or glass substrate are crushed to an appropriate degree as the polishing tape is pressed against the surface and hence deep scratches and abnormal protrusions are not formed. These crushed particles serve to form fine texturing marks. Since these crushed particles have sharper corners than agglomerated polycrystalline diamond particles, finer texturing marks can be formed than by means of agglomerated polycrystalline diamond particles.

BRIEF DESCRIPTION OF THE DRAWINGS

FIG. 1 shows an example of polishing device which can be used for carrying out a texturing process according to this invention.

FIG. 2 is a photograph by a transmission type electron microscope of clusters used in Test Example.

FIG. 3 is a photograph of a computer-generated image of the surface of a glass substrate after a texturing process of Test Example.

FIG. 4 is a photograph of a computer-generated image of the surface of a glass substrate after a texturing process of Comparison Example 1.

FIG. 5 is a photograph of a computer-generated image of the surface of a glass substrate after a texturing process of Comparison Example 2.

FIG. 6A is a plan view (enlarged 50 times) of the surface of a woven cloth comprising microfibers and FIG. 6B is an enlarged (by 1000 times) view of microfibers constituting the woven cloth of FIG. 6A.

FIG. 7A is a plan view (enlarged 50 times) of the surface of an unwoven cloth comprising microfibers and FIG. 7B is an enlarged (by 1000 times) view of microfibers constituting the unwoven cloth of FIG. 7A.

FIG. 8A is a plan view (enlarged 50 times) of the surface of a raised cloth comprising microfibers and FIG. 8B is an enlarged (by 2000 times) view of microfibers constituting the raised cloth of FIG. 8A.

DETAILED DESCRIPTION OF THE INVENTION

A magnetic hard disk substrate of this invention is obtained by forming texturing marks on the surface of an aluminum substrate prepared by mirror-polishing a surface of a disk made of an aluminum alloy and forming on this surface an electroless plating layer of Ni—P or on the surface of a glass substrate comprising unreinforced glass, reinforced glass or crystallized glass.

A magnetic hard disk substrate embodying this invention may be characterized as having texturing marks with line density greater than 70 lines/μm in the radial direction on the surface of an aluminum or glass substrate. Its average surface roughness is 0.5 nm or less. The ratio d/p of the depth d of the valley part of the texturing marks with respect to the pitch p of the texturing marks is within the range of 0.01–0.3.

FIG. 1 shows an apparatus 10 for forming texturing marks which may be used for producing a magnetic hard disk substrate of this invention as described above. The apparatus 10 of FIG. 1, shown also in Japanese Patent Publications Tokkai 11-90810 and 11-161946, is for forming texturing marks on both surfaces of a substrate 17 simultaneously but an apparatus such as disclosed in Japanese Patent Publication 6-195701 for texturing only one surface may be used to texture only one surface.

A method of producing a magnetic hard disk substrate according to this invention is explained next with reference to FIG. 1. After a substrate 17 (such as an aluminum substrate or a glass substrate) is attached to a shaft 14 connected to a drive motor 13, the substrate 17 is rotated by the drive motor 13 at a rate of 200–800 rpm. Polishing tapes 12 are run at a speed of 2.5–13 cm/sec in a direction opposite to the rotation of the substrate 17. Next, while slurry is supplied through nozzles 15 onto both surfaces of the substrate 17, these polishing tapes 12 are pressed against the surfaces of the substrate 17 by means of contact rollers 11 to form texturing marks on the surfaces of the substrate 17. The pressure of compression by the polishing tapes 12 is within the range of 0.45–9 kg. While these polishing tapes 12 are being pressed against the surfaces of the substrate 17, the polishing tapes 12 may be caused to undergo oscillatory motion in the radial direction of the substrate 17. The oscillation is at a frequency within the range of 1–10 Hz and its amplitude (that is, one half of the total extent of oscillation) is about 1 mm.

After the texturing process as described above, a cleaning liquid such as water is blown through the nozzles 16 onto the surfaces of the substrate 17 while the substrate 17 continues to be rotated so as to wash the substrate 17 and to thereby produce a magnetic hard disk substrate of this invention.

The polishing slurry to be used in a method of this invention is comprised of abrading particles and a dispersant for these abrading particles. The abrading particles comprise cluster particles as shown in FIG. 2 of monocrystalline diamond particles with diameters in the range of 1–50 nm, polycrystalline diamond particles or both. It is not necessary, however, that all abrading particles be cluster particles. Agglomerated cluster particles formed by cluster particles becoming agglomerated inside the dispersant may also be used as abrading particles together with the cluster particles. In the method of this invention, such cluster particles and agglomerated cluster particles in the slurry supplied onto the surfaces of the magnetic hard disk substrate are broken up to an appropriate degree by the pressure applied by the polishing tapes and such broken-up particles contribute to the polishing of the surfaces of the magnetic hard disk substrate together with the cluster particles and agglomerated cluster particles.

For texturing the surface of a glass substrate comprising unreinforced glass, reinforced glass or crystallized glass, it is desirable to use only cluster particles composed of monocrystalline diamond particles. This is probably because the surfaces of a glass substrate are hard and hence polygonal monocrystalline diamond particles with sharp corners can provide stronger polishing power than polycrystalline diamond particles with round corners.

Cluster particles may be obtained by the explosion-synthesis method known for the production of diamond particles (such as disclosed in Japanese Patent Publication Tokkai 2000-136376) whereby a starting material comprising a metallic catalyst (Co, Ni, Fe, etc.) and graphite powder is impulse-compressed at a high temperature by the explosion of an explosive. Those containing a relatively small amount of graphite not reacted are preferred. Cluster particles thus obtained are tasseled assemblies of very small crystalline particles with no directionality.

The diameters of the monocrystalline and polycrystalline diamond particles are within the range of 1–50 nm. If monocrystalline and polycrystalline diamond particles with diameters in excess of 50 nm are used, more scratches and protrusions are formed and if monocrystalline and polycrystalline diamond particles with diameters less than 1 nm are used, the work efficiency is adversely affected.

The content of abrading particles should be 0.01 weight % or greater with respect to the total amount of the polishing slurry. It is preferably in the range of 0.01–3 weight % and more preferably in the range of 0.01–1 weight %. If the content of the abrading particles is less than 0.01 weight %, it is difficult to form texturing marks accurately and at a high density on the surface of the magnetic hard disk substrate. If the content of the abrading particles exceeds 3 weight %, there is no change in the density or shape of the texturing marks formed on the surface of a magnetic hard disk substrate. In other words, texturing marks can be formed on the surface of a magnetic hard disk substrate at a density greater than 70 lines/$\mu$m in the radial direction already with the content of the abrading particles less than 3 weight % (say, 1 weight %) and hence it is economically advantageous to keep the content of the abrading particles below 3 weight % to reduce the material cost.

Water or a water-based aqueous solution is used as the dispersant. Such a water-based aqueous solution is produced by adding to water a water-soluble additive with a good washing capability that can improve dispersion of cluster particles and agglomerated cluster particles in the polishing slurry of this invention and also the lubricity during the texturing process. Examples of such water-based aqueous solution include solutions obtained by adding to water one or more additives such as non-ionic surfactants, organic esters of phosphoric acid, higher fatty acid amides, glycol compounds, higher fatty acid metallic salts, amine salts of vegetable oils and fats, and anionic surfactants. The content of such an additive (or additives) is within the range of 1–10 weight % with respect to the entire amount of the polishing slurry.

Examples of non-ionic surfactant to be used as an additive include the higher alcohol type, the twin type, the pluronic type and the sorbitan type. Examples of organic esters of phosphoric acid include the aromatic salt type, the aliphatic salt type and the aliphatic acid type. Examples of higher fatty acid amide include lauric acid diethanol amide, ersinic acid diethanol amide, ricinoric acid isodipropanol amide and stearic acid diethanol amide. Examples of glycol compounds include alkylene glycols, polyethylene glycols and polypropylene glycols. Examples of higher fatty metallic acid salt include potassium ricinoleate and potassium oleate. Examples of anionic surfactant include alkyl benzene sulfonic acid, sodium dodecil sulfate and sodium stearate. Additives of appropriate kinds should be selected, depending upon the kind and the surface condition of the magnetic hard disk substrate to be processed.

Examples of the polishing tape include woven cloth tapes, unwoven cloth tapes, flocked cloth tapes, raised cloth tapes and tapes comprising a foamed material. The woven cloth, unwoven cloth and raised cloth are comprised of fibers with thickness in the range of 0.1–5 $\mu$m, referred to as microfibers. Views of the surface of a woven cloth (enlarged 50 times) and that of the microfibers constituting this woven cloth (enlarged 1000 times) are respectively shown in FIGS. 6A and 6B. Views of the surface of an unwoven cloth (enlarged 50 times) and that of the microfibers constituting this unwoven cloth (enlarged 1000 times) are respectively shown in FIGS. 7A and 7B. Views of the surface of a raised cloth (enlarged 50 times) and that of the microfibers constituting this raised cloth (enlarged 2000 times) are respectively shown in FIGS. 8A and 8B.

Examples of flocked fabric that may be used include those obtained by attaching hairs known as piles onto the surface of a woven cloth, an unwoven cloth or a plastic sheet by a known electrostatic hair planting process, as well as those obtained by sewing piles and tufts (fibers made into loops or tassels) onto a woven or unwoven cloth. Woven and unwoven cloths which serve as the base for such flocked fabric need not comprise microfibers as long as the piles or the tufts themselves of the flocked fabric are microfibers of the thickness described above. Aforementioned raised cloth is obtained by cutting a portion of the fibers constituting the surface fiber system of a woven cloth comprising microfibers and raising these fibers. Only the raised portions may comprise microfibers. The raised cloth may be one wherein either the warps or wefts of the fiber structure of a woven cloth are microfibers which are cut and raised.

Thus, at least a surface portion (that is, the portion that comes to directly contact the surface of a magnetic hard disk substrate during a polishing process) of a tape made of such a woven, unwoven, flocked or raised cloth is formed with microfibers with thickness in the range of 0.1–5 $\mu$m. This is for the purpose of allowing the abrading particles to be appropriately held on the surface portion of the tape coming into contact with the surface of a magnetic hard disk substrate such that fine texturing marks can be formed at a high line density on the surface of the magnetic hard disk substrate. If the thickness of the contacting fibers of the tape is less than 0.1 $\mu$m, the points of contact between the fibers at the surface portions of the tape and the abrading particles become too few and the abrading particles cannot act sufficiently on the surface of the magnetic hard disk substrate. This affects the grinding power adversely and texturing marks cannot be formed clearly and accurately. If the thickness of these fibers is greater than 5 $\mu$m, on the other hand, the step differences between fibers constituting the tape surface become too large and fine texturing marks cannot be formed uniformly on the surface of the magnetic hard disk substrate.

Tapes made of a foamed material have voids scattered throughout therein that are formed by bubbles generated when the foamed material was obtained. Indentations due to such voids are scattered over the surface of a tape made of such a foamed material. The diameters of these surface indentations are in the range of 0.1–5 $\mu$m.

The invention is described next by way of test and comparison examples.

TEST EXAMPLE

A polishing device as shown in FIG. 1 was used to carry out a texturing process on the surfaces of a glass substrate for a magnetic hard disk to produce a magnetic hard disk substrate of this invention. The surfaces of this glass substrate are preliminarily mirror-polished. The average surface roughness (Ra) of the surfaces of this glass substrate prior to the texturing process was 7 Å.

Polishing slurry with composition as shown in Table 1 was used, A high-concentration stock solution was preliminarily prepared and the polishing slurry as shown in Table 1 was obtained by diluting this stock solution with pure water. This was because it is sometimes done as a practical matter to make such a high-concentration (say, 10 times or 100 times) stock solution available to the user such that the user has only to dilute it with water for actual use. Cluster particles comprising monocrystalline diamond particles with diameters within the range of 1–50 nm produced by an explosion-synthesis method were used. FIG. 2 is a photograph of these cluster particles taken by a transmission electron microscope (TEM). As an additive to the dispersant for these cluster particles, a surfactant of glycol compound (alkylene glycol) was used.

TABLE 1

| | |
|---|---|
| Cluster particles | 0.05 weight % |
| Additive (surfactant of glycol compound) | 5 weight % |
| Pure water | 94.95 weight % |

A tape of a woven cloth of thickness 700 μm comprising nylon fibers of thickness about 2 μm was used as the polishing tape.

The texturing process on the surfaces of the glass substrate was carried out under the conditions shown in Table 2 below.

TABLE 2

| | |
|---|---|
| Rotary speed of glass substrate | 400 rpm |
| Running speed of tape | 6 cm/minute |
| Supply rate of polishing slurry | 15 cc/minute |
| Hardness of contact rollers | 60 duro |
| Oscillation (amplitude) | 5 Hz (1 mm) |
| Pressure by contact rollers | 4.5 kg |
| Process time | 20 seconds |

Comparison Tests

Results of aforementioned Test Example were compared with those of Comparison Examples 1 and 2 described below regarding the average surface roughness (Ra) and maximum height (Rp) of the glass substrate after the texturing process and the line density of texturing marks on the surface of the glass substrate.

The average surface roughness (Ra) and maximum height (Rp) of the glass substrate after the texturing process were measured by using a scanning probe microscope (Nanoscope Dimension 3100 Series, produced by Digital Instrument Co.) and the line densities of texturing marks on the surfaces of glass substrates were measured from the photographs of computer-generated images after the texturing processes. These computer-generated images are each obtained by scanning 512 points over an arbitrarily selected area of 1.0 μm×1.0 μm on the surface of a glass substrate and presenting the result three-dimensionally. FIGS. 3, 4 and 5 respectively show results of Test Example, Comparison Example 1 and Comparison Example 2.

Comparison Example 1

Polishing slurry with composition as shown in Table 3 was used to carry out a texturing process on the surfaces of a glass substrate by using the same polishing device and polishing tape as used in Test Example under the conditions shown in Table 2. The average surface roughness of the glass substrate prior to the texturing process was 7 Å. Agglomerated polycrystalline diamond particles used as the abrading particles of the polishing slurry for Comparison Example 1 were polycrystalline diamond particles (primary particles) of average diameter 20 nm agglomerated inside the dispersant. The same surfactant of glycol compound used in Test Example was also used as an additive.

TABLE 3

(Composition of polishing slurry for Comparison Example 1)

| | |
|---|---|
| Agglomerated polycrystalline diamond particles (average diameter of primary particles = 20 nm) | 0.05 weight % |
| Additive (surfactant of glycol compound) | 5 weight % |
| Pure water | 94.95 weight % |

Comparison Example 2

Polishing slurry with composition as shown in Table 4 was used to carry out a texturing process on the surfaces of a glass substrate by using the same polishing device and polishing tape as used in Test Example under the conditions shown in Table 2. The average surface roughness of the glass substrate prior to the texturing process was 7 Å. Agglomerated polycrystalline diamond particles used as the abrading particles of the polishing slurry for Comparison Example 2 were polycrystalline diamond particles (primary particles) of average diameter 8 nm (about the same diameter as the monocrystalline diamond particles constituting the cluster particles of Test Example) agglomerated inside the dispersant. The same surfactant of glycol compound used in Test Example was also used as an additive.

TABLE 4

(Composition of polishing slurry for Comparison Example 2)

| | |
|---|---|
| Agglomerated polycrystalline diamond particles (average diameter of primary particles = 8 nm) | 0.05 weight % |
| Additive (surfactant of glycol compound) | 5 weight % |
| Pure water | 94.95 weight % |

Results of Tests

Results of tests made on aforementioned Test and Comparison Examples are summarized in Tables 5 and 6 below.

TABLE 5

| | Ra (Å) | Rp (Å) | Line density (lines/μm) |
|---|---|---|---|
| Test Example | 1.8 | 25 | 85 |
| Comparison Example 1 | 4.0 | 65 | 55 |
| Comparison Example 2 | 1.0 | 15 | Lines not clear |

TABLE 6

| | d/p | Average of d/p |
|---|---|---|
| Test Example | 0.01–0.2 | 0.03 |
| Comparison Example 1 | 0.01–0.5 | 0.05 |
| Comparison Example 2 | 0–0.2 | Lines not clear |

It should be clear from FIGS. 5 and 6 that Test Example has smaller average surface roughness (Ra) and maximum protrusion height (Rp) and more than 1.5 times as large line density of texturing marks than Comparison Example 1. The range and the average of the ratio d/p of the depth d with respect to the pitch p of the textured marks are both smaller for Test Example. This means that more accurate texturing marks can be formed uniformly at a higher line density on a glass substrate if a method of this invention is used. Comparison Example 2 shows about the same average surface roughness (Ra) and maximum protrusion height (Rp), but there were places where the ratio d/p became 0. Thus, clear texturing marks were not formed on the surface of the glass substrate and the line density of texturing marks and the average value of d/p could not be ascertained.

In summary, the present invention has the merit that fine texturing marks can be formed uniformly on the surface of an aluminum or glass substrate without abnormal protrusions at a line density in the radial direction of greater than 70 lines/$\mu$m.

What is claimed is:

1. A method of producing a magnetic hard disk substrate, said method comprising the steps of:

rotating in a specified direction a substrate selected from the group consisting of aluminum substrates and glass substrates, said substrate having a surface;

supplying polishing slurry on said surface; and pressing a polishing tape on said surface and running said polishing tape in a direction opposite to said specified direction of rotation of said substrate;

wherein said polishing slurry comprises:

abrading particles with diameters in the range of 1–50 nm, selected from the group consisting of monocrystalline diamond particles, polycrystalline diamond particles and cluster particles comprising monocrystalline and polycrystalline diamond particles; and a dispersant for said abrading particles selected from the group consisting of water and water-based aqueous solutions;

wherein texturing marks with a line density greater than 70 lines/$\mu$m in a radial direction are formed on said surface.

2. The method of claim 1 wherein said polishing slurry further comprises agglomerated cluster particles comprising said cluster particles that are agglomerated in said dispersant.

3. The method of claim 1 wherein said polishing slurry contains said abrading particles by 0.01 weight % or more of the total weight of said polishing slurry.

4. The method of claim 1 wherein said polishing slurry contains said abrading particles by 0.01–3 weight % of the total weight of said polishing slurry.

5. The method of claim 1 wherein said polishing slurry contains said abrading particles by 0.01–1 weight % of the total weight of said polishing slurry.

6. The method of claim 1 wherein said water-based aqueous solution is an aqueous solution having an additive added to water, said additive comprising one or more selected from the group consisting of non-ionic surfactants, organic phosphoric acid esters, higher fatty acid amides, glycol compounds, higher fatty acid metallic salts, amine salts of vegetable oils and fats and anionic surfactants.

7. The method of claim 6 wherein said additive is 1–10 weight % of the total weight of said polishing slurry.

8. The method of claim 1 wherein said polishing tape is of a material selected from the group consisting of woven cloth, unwoven cloth, flocked cloth, raised cloth and foamed materials.

9. The method of claim 8 wherein said woven cloth, said unwoven cloth and said raised cloth comprise microfibers.

10. The method of claim 8 wherein said flocked cloth has microfibers planted and said raised cloth has microfibers that are raised.

11. The method of claim 9 wherein said microfibers have a thickness in the range of 0.1–5 $\mu$m.

12. The method of claim 10 wherein said microfibers have a thickness in the range of 0.1–5 $\mu$m.

13. The method of claim 8 wherein said foamed material has a surface with indentations formed by air bubbles, said indentations have diameters in the range of 0.1–5 $\mu$m.

* * * * *